United States Patent
Taylor et al.

(10) Patent No.: US 7,681,840 B1
(45) Date of Patent: Mar. 23, 2010

(54) SPACE TRANSPORTATION NODE INCLUDING TETHER SYSTEM

(76) Inventors: Thomas C. Taylor, 3705 Canyon Ridge Arc, Las Cruces, NM (US) 88011; Walter P. Kistler, 123 105th Ave., SE., Bellevue, WA (US) 98004; Robert A. Citron, 123 105th Ave., SE., Bellevue, WA (US) 98004

( * ) Notice: Subject to any disclaimer, the term of this patent is extended or adjusted under 35 U.S.C. 154(b) by 0 days.

(21) Appl. No.: 12/331,311

(22) Filed: Dec. 9, 2008

Related U.S. Application Data

(62) Division of application No. 11/232,932, filed on Sep. 23, 2005, now Pat. No. 7,503,526.

(51) Int. Cl.
*B64G 1/28* (2006.01)
(52) U.S. Cl. .................. 244/158.2; 244/172.4
(58) Field of Classification Search ............ 244/158.2, 244/158.4, 172.4
See application file for complete search history.

(56) References Cited

U.S. PATENT DOCUMENTS

| 6,523,783 B2 * | 2/2003 | Lounge et al. | 244/172.4 |
| 6,981,674 B1 * | 1/2006 | Dempsey | 244/158.2 |

* cited by examiner

*Primary Examiner*—Timothy D Collins
(74) *Attorney, Agent, or Firm*—Fulbright & Jaworski LLP

(57) ABSTRACT

A transportation node that orbits a celestial body includes a truss having two ends with least at one end of the truss having at least one coupling tether cable with a tether tip at individual ends. The truss, while orbiting the celestial body, rotates around its center of mass in a direction to control the tether tip in relation to a surface of the celestial body and to cancel a relative velocity between the tether tip and the surface for transferring a payload attached to the tether tip to and from the surface. A method of transferring payload to and from a celestial body includes reeling in/out from an orbiting transportation node a coupling tether cable with a tether tip configured to attach to the payload.

22 Claims, 12 Drawing Sheets

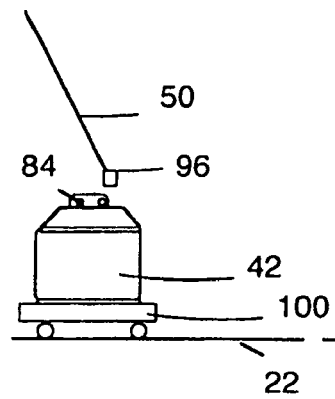
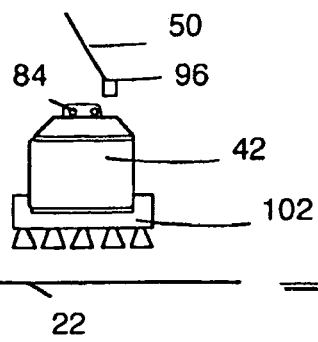
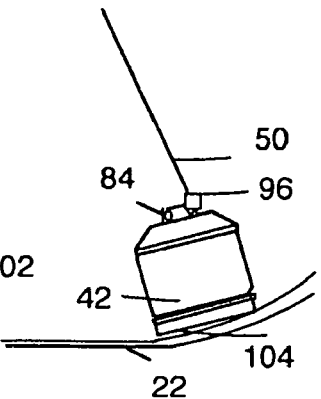
FIG. 8A  FIG. 8B  FIG. 8C
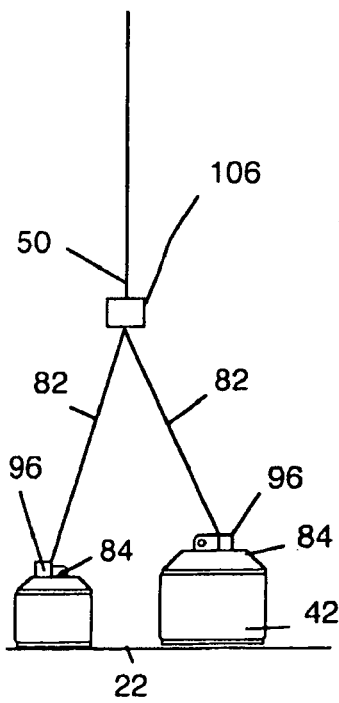
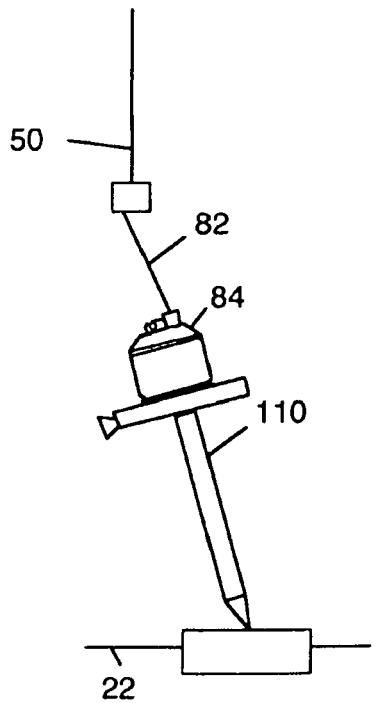
FIG. 8D  FIG. 8E

US 7,681,840 B1

SPACE TRANSPORTATION NODE INCLUDING TETHER SYSTEM

RELATED APPLICATIONS

This application is a division of prior U.S. application Ser. No. 11/232,932, entitled "Space Transportation Node Including Tether System," filed Sep. 23, 2005 now U.S. Pat. No. 7,503,526, the disclosure of which is expressly incorporated herein by reference in its entirety.

GOVERNMENT RIGHTS

No government funding, no government support or government contract or clause is related to this invention.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

TECHNICAL FIELD

The present invention relates to space transportation. More specifically, the present invention relates to space transportation nodes including tether systems.

BACKGROUND

Resource recovery operations on Earth require an economic feasibility with a financial return on the invested capital. The cost of transporting payloads to and from the moon is a barrier to economic development of the moon.

Rocket propelled space vehicles transporting cargo outside the proximity of the Earth in airless space do not require the same vehicle hardware to push up through the atmosphere or land on the moon, but discarding the vehicle hardware on each mission like Apollo is still expensive. The space exploration initiative announced by President Bush and implemented by NASA has the opportunity to mature the transportation cycles beyond the Earth and the moon. The requirements and cost for each of these six lunar transportation cycles is different and the requirements for manned versus unmanned missions differs greatly.

If one breaks out these different cycle or leg transportation requirements for each portion of a lunar trip, then six distinct transportation cycles emerge. As each cycle matures, it becomes more effective and efficient Commerce competitive forces help accelerate this maturing process and the evolution into a cost competitive transportation environment.

The transportation cycles emerging are Earth to low Earth orbit or LEO, LEO to Lunar orbit "LO," LO to the lunar surface, the lunar surface back to LO, LO to LEO and the re-entry from LEO to the Earth's surface. Placing a transportation node between each of the separate cycles would accelerate the maturing of the transportation process and facilitate introducing commerce. In a mature transportation cycles on Earth, we find that changing the requirements for a portion of a trip, like from water to land results in the change of a vehicle and results in a harbor emerging.

Why not fly and eliminate the harbor? Well, people fly, eliminate the harbor and pay the extra cost, but most cargo goes a different less expensive route through the harbor. The airport becomes the transportation node for humans and the harbor is for cargo with very different costs related to transportation. Aircraft manufacturers want all humans and cargo to fly, but when paying for the transportation, the cost competitive aspects become important.

In a remote site like the moon, the ratio of humans to cargo is significantly skewed. In looking at similar remote locations on Earth the ratio is less than 1% human and 99% cargo. To combine the manned and unmanned portions as we did in Apollo makes space transportation expensive, in part, because the safety and reliability of manned space flight is expensive. Such manned vehicles may be similar to the Saturn vehicle of the Apollo project, which landed the first man on the moon more than 30 years ago. The next series of exploration trips to the moon might consider separating unmanned cargo from humans in some manner consistent with safety.

Rendezvousing, docking and transferring payloads between space vehicles was performed more than forty years ago in the Apollo program, and more recently between shuttles and the International Space Station. The Apollo program used a form of transportation node, for example, the astronauts had to transfer cargo from the lunar lander to the command module in lunar orbit. The command module in lunar orbit was a node in the transportation system and saved mass from being transported to and from the moon's surface.

Today these transportation node techniques and procedures can be refined and used, for example, between each of the six transportation cycles and two of the nodes already exist, the Spaceports on Earth and the International Space Station. Travel between them has become partly commercial and will become competitive. In such conventional systems, the actual transfer of cargo is performed by people after docking of the vehicles and opening of a hatch, However, the automatic transfer of cargo between two vehicles in space, such as unmanned space vehicles, is a more complex operation, but possible by combining innovation with conventional systems. The enhancement of the transportation process to be more effective and more affordable can also happen.

U.S. Patent Application Publication No. 2002/0079407 to Lounge et al. entitled, "Underway replenishment system for space vehicles" discloses a replenishment system used to deliver payloads and supplies to an orbiting receiving space vehicle using a tether. The 2002/0079407 application does not enhance the payload movement. The 2002/0079407 application discloses a method of transferring payloads between a delivering space vehicle and a receiving space vehicle, but falls short of a transportation node.

U.S. Pat. No. 4,790,499, to Taylor, et at, describes docking with an orbital object using a tether. Docking with an object at the end of a cable is less likely to damage the orbital facility because both objects can move in rendezvous and docking operations. The '499 patent discloses a passive operations with no mention of active "seeker" tether tip operations.

SUMMARY OF THE INVENTION

The present invention has been made in view of the above-described problems. Accordingly, it is an object of the present invention to provide a system, method and an apparatus for more efficient and more affordable transport, storing, transferring and enhancement of payloads and their vehicles in space using an evolving transportation node system. The present invention operates with a reusable highway to the moon approach with special capabilities and innovation. This transportation node system uses an external tank salvaged from the space shuttle system to design and develop a series of mass heavy nodes capable of enhancing the movement of mass in space including the innovation related to active "seeker" tether tip operations, the enhancement of the payload or rocket or enhancement in tandem, forward versus reverse rotation, matching ground velocity, lunar surface delivery direct, seeker tip heads, orbital pumping, platform movement along the tether, center of mass changing, multiple payload tips, tip transfer to platform, and bulk cargo re-entry using rotation control air ram lift.

A primary object of the present invention is cost reduction over an extended period of time during the development of another celestial body by building a lunar highway capable of being applied to other celestial bodies in the universe. The transportation of cargo between locations in space can be separated into a series of transportation cycles, as has happened historically in transportation on Earth. A transportation cycle is defined as start, change location and stop. This means start and stop between the transport function is a node, which connects the various cycles. The node involves changing transport vehicle hardware, refueling, cargo transfer and commerce. In mature space transportation cycles this means each individual transport of mass can use the most effective and least cost method of transport.

This maturing also results in the most effective vehicle on each cycle on Earth. Imagine a cargo container originating overseas, it starts on a truck that transports the cargo to the seaport, where the cargo is loaded on a container ship, transported to another port, and then loaded on a train. The cargo eventually finds its destination on a truck with vehicle servicing occurring in the background.

In space, the node is a service station, cargo transfer and storage and the location where other commerce will evolve. Space transportation cycles existing now include movement of mass from Earth to orbit with the vehicle discarded and no return trip. Limited round trip capability is offered by the mostly reusable space shuttle. Fully reusable vehicles are anticipated in the future. Starting from Earth and accomplishing a round trip to the moon, for example can be done, but has been expensive. The "one shot" Apollo missions were expensive partly, because all the hardware was expended on each mission and the propellant was carried from Earth and most of the propellant mass required for the entire round trip was carried for most of the trip.

High costs create a barrier to the commercial transportation hardware development of space and the investment of private capital in technically viable space transportation ventures. Part of this cost is the expense caused by expending the hardware and part is the logistics operations required. Propellant is currently 90% or more of the logistics mass beyond Earth orbit. This invention changes that fact in an attempt to lower costs.

A primary advantage of the present invention is a maturing of the Apollo "one shot" expendable vehicle to a reusable transportation system with a capability of affordably moving mass in both directions using nodes to enhance the transportation process and stimulate commerce beyond our planet.

A transportation node is inserted in Earth and lunar orbits to permit opportunities to lower cost, to establish commercial opportunities, to attract private investment and to stimulate international cooperation. The resulting "Lunar Highway" establishes a transportation system capable of growth, evolution, cooperation and commerce with other nations plus can be adapted for longer Space Exploration Initiative missions to Mars and beyond.

In the transportation of cargo to and from the moon, a payload carrier or pallet can be used to support and transfer cargo mass loads (or payloads) into a space transport vehicle. The payload carrier is designed to be transported from the Earth surface to low Earth orbit with a protective shroud, which is jettisoned as it exits the atmosphere. The payload carrier is attached to an Earth originating space launch vehicle, which is capable of rendezvous and docking in space with an Earth orbit transportation node to discharge cargo. The payload carrier is designed to be transferred easily from a first space launch vehicle to a second lunar transport vehicle in a vacuum and requires no shroud. The payload carrier may be transferred to a third vehicle with landing legs in orbit around another celestial body, such as the moon. The transfer can be automatic after the delivery vehicle aligns with the receiving vehicle, and can be accomplished without humans being involved in space. The payload carrier or pallet can be used for transport both to and from the moon, so that it can be a reusable hardware item. The payload carrier or pallet can also be used for an independent application on the lunar surface, as is sometimes the case in remote logistics situations.

The present invention further provides payload transfer, payload storage, vehicle enhancement, hardware for manned or unmanned transportation support for vehicles and can evolve to accommodate a variety of vehicles from all nations. Such node hardware permits delivery of payloads using transportation hardware in Earth orbit to locations beyond Earth orbit. The present invention provides affordable commercial payload transportation services for space vehicles at orbital transportation support nodes at the end of various transportation cycles within space transportation in general.

According to one aspect of the invention, the lunar transportation is divided into six transportation cycles with two proposed nodes. One of these nodes is configured to be positioned in orbit around Earth. The platform is configured to start with the storage of propellant and permit transfer to other vehicles. The other node is configured to be positioned in orbit around the moon. Both nodes are configured to be used in tandem in both directions in the pursuit of exploration of the moon and other celestial bodies in the universe. These early nodes are configured to accumulate propellant and other transportation support items and services in orbit.

According to a further aspect of the invention, these early nodes are configured to permit growth in mass, and capability to stimulate commerce. Commercial propellant sales should increase, as should sales of other transportation support items and services in each orbit.

According to a further aspect of the invention, these early nodes use the external tank, as salvaged from the space shuffle system, to design and provide the mass required to enhance (i.e., productively transport with less expense than when using propellant) the payloads and vehicles using them.

According to a further aspect of the invention, a series of mass heavy nodes capable of enhancing the movement of mass in space with additional innovation and evolution are developed.

According to a further aspect of the invention, these early nodes use active "seeker" tether tip devices. In other words, the devices have propulsive energy and a positioning system. Because they are attached to a tether, the have increased maneuverability and require lower cost for movement. The nodes also use techniques and operations in the enhancement of mass movement in two directions. For example, these early nodes use forward and reverse rotation in the enhancement of mass movement in two directions.

According to a still further aspect of the invention, lunar surface direct delivery is used, including such techniques as matching ground speed, orbital pumping, platform movement along the tether, and center of gravity (or mass) changing. In one aspect, multiple payload tips are used.

According to a further aspect of the invention, these early nodes use bulk cargo re-entry using rotation control air ram lift for bulk re-entry of mass resources back to the Earth's surface.

According to a further aspect of the invention, the node includes a truss provided for services. The truss is the beginning of a transportation node expansion The truss increases the node length and takes advantage of the gravity gradient stability in orbit around a celestial mass. In other words, the longer the platform, the more different the orbit of the upper end of the platform is from the orbit of the bottom end.

According to a further aspect of the invention, the transfer mechanism is configured to be a tether tip with accommodations for coupling, storage and release at various locations within the control of the transportation node. The tip of the tether is an improvement of the tip disclosed in U.S. Pat. No. 4,790,499 issued Dec. 13, 1988 to Thomas C. Taylor, the disclosure of which is expressly incorporated by reference herein in its entirety. Some additional capabilities include the active capture of transportation vehicles and payloads, as well as receiving and providing various services.

According to a further aspect of the invention, the node further includes a docking/berthing mechanism configured to facilitate positioning and docking of the platform. The tether tip device can substitute one payload mass for another quickly and can accommodate multiple objects. The active commanded docking mechanism can include a commanded release. The attachment or docking mechanism can be provided at the end of the node. The node can be a substantial piece of real estate that can be developed by others.

According to another aspect of the invention, a system has multiple tether tips on the platform for use as coupling or attaching devices, thereby allowing multiple payloads and vehicles to be engaged and serviced at one time including using one mass to balance another in enhancing operations.

According to another aspect of the invention, a multiple tether tip system can be pulled near the node tip and mesh in such a manner as to allow multiple payloads and vehicles to be transferred to the node for storage, servicing and other operations, including the transfer of humans to and from the node.

According to another aspect of the invention, a node system with multiple tether tips can be propelled to rotate around its individual center of mass as it rotates in orbit around a celestial body. The rotation balances or cancels out the rotation around a body with the back spinning velocity of the rotating node, resulting in a near zero velocity as the payloads on the end of a tether are either placed on the surface of the moon or picked up from the surface of the moon. That is, end over end rotation of the platform around its center of mass can be neutralized by rotation of the platform around the celestial body being orbited. When the payloads on the end of a tether are both attached to the tether, a near simultaneous (i.e., gradual) transfer of the payload mass is accomplished to minimize the impact load on the tether.

According to another aspect of the invention, a node system includes multiple tether tips with seeker heads with the capacity to maneuver, move along the tether and swing on the tether, seeking and acquiring the location of an attachment location for purposes of using maneuvering abilities to close with, attach and release as required for effective operations. Attachment is assured before release, the impact on the tether is minimized, and a near simultaneous transfer of load occurs.

According to another aspect of the invention, a node system with multiple tether tips rotating to achieve near zero rotational velocity at the surface can further minimize the transfer impact on the tether system using a forward ground velocity and/or a short upward rocket sled boost and/or forward ground velocity created with an electrodynamic rail gun or mass driver, and/or a forward tower created velocity. The transfer impact can be further minimized by using a multiple capture with twin tether tips. In this case mass is near simultaneously transferred from one attached tether tip to another attached tether tip.

According to another aspect of the invention, a transportation node system with multiple tether tips can change its center of mass by moving mass from one location to another on the platform length thereby pumping the platform to change its location based on the diameter difference between the equator and the poles. Alternatively or in addition, the center of mass is changed based on irregular magnetic forces of the Earth or other orbited celestial body.

According to another aspect of the invention, a transportation node system with multiple tether tips can include a minor axis truss roughly parallel to the surface of the Earth and perpendicular to a major gravity gradient axis pointing toward the center of the celestial mass or body. The minor axis truss naturally rotates one revolution for each orbit and can be propelled to spin faster to produce the ability to release payloads to change their orbital inclination.

According to another aspect of the invention, a launched system deployable on orbit near a transportation node system has the ability to re-enter with large mass multiple resource payloads using a rotational lift provided from inflated lifting wings rotating and adjusting lift in relation to re-entry forces with a forward tether mass used for steering.

According to another aspect of the invention, a transportation node system with multiple tether tips can launch and recover sub-nodes. The sub-nodes are capable of managing, storing, recovering and repairing a tether when the tether become severed or damaged. One way to determine the tether is severed is by detecting tension change. The sub-node has the ability to maneuver to and reattach the two severed tether ends. The sub-nodes can be capable of reverse winding, thereby increasing the speed of recovering or letting out the tether tine. The sub-nodes can be capable of inflatable deployment in orbit, thus increasing their diameters and effectiveness. In other words, the reel speed is controlled by the reel diameter. The sub-nodes can include an external tether cone re-acquiring system enabling approach of a loose tether end in free space, activating a circular rotating belt device capable of grabbing the tether line or tape, pulling it inside the tether repair system and re-establishing the tether line functions.

According to an aspect of the present invention, a transportation node system orbits a celestial body. The system includes a truss having two ends, the truss rotating around its center of mass while orbiting the celestial body. The truss stores payloads. The system also has multiple tether tips, each attached to one end of the truss via a tether so that each tether tip can extend from the truss and retract to the truss for transfer of payloads. The tether runs through the length of the truss and connects to each tether tip, which is capable of engaging payloads. The system also includes at least one tether cable reel that reels in and reels out the tether so the tether tips can extend from and retract to the truss. In one embodiment the system has a mass at least fifteen times a sum of a mass of an average payload and a mass of a transportation craft.

The tether reel can be inflatable so that when the tether reel is inflated, a diameter of the tether reel increases enabling faster reeling. Each tether tip can include a tether tip frame attached to the truss via the tether, the tether tip frame having a storage section for storing payloads, and a secondary tether that engages payloads. The transportation node system can change a center of mass by moving mass along the truss length. The transportation node system can also change a center of mass based upon irregular magnetic forces of the celestial body. Alternatively (or in addition), the system changes a center of mass based upon a diameter difference between the celestial body's poles and equator.

In one embodiment, the system also includes a payload elevator that transfers payloads within the system. The truss can also include an external tank (ET) truss that attaches to salvaged external tanks. The ET truss attaches to aft solid rocket booster hard points of each salvaged ET, attaches to aft orbiter hardware attachment points of each salvaged ET, and attaches to forward solid rocket booster hard points of each salvaged ET.

At least one of the payloads can be a moveable tank for storing cryogenic propellant. The propellant tank is enclosed by the ET and cooled by a cooling system. Thus, propellant is stored without breaking a seal on the propellant tank. The system can also include a rail gun, tower accelerator, forward velocity cart, rocket sled, and/or mass driver to match velocities at tether tip transfers at a surface of the celestial body and to minimize impact when a payload is transferred from one of the tether tips to the surface of the celestial body.

The system can also include tether sub-nodes distributed along the tether. Each sub-node has detectors that detect severing of the tether. Each sub-node includes propulsion and attitude control enabling a close sub-node, which is nearest to the breaking point of the tether, to maneuver towards the breaking point of the tether. Each sub-node includes a tether reel for reeling in and reeling out the tether. In one embodiment, sub-nodes on either side of the severed tether repair the severed tether by attaching to each other after the tether severs. In another embodiment, sub-nodes on either side of the severed tether repair the severed tether by attaching to the tether at the severed end and restoring the severed tether to service.

The system can also include a cross truss that extends along a cross truss axis that intersects with a long axis of the truss. The cross truss rotates around the long axis and has a capability of engaging and disengaging payloads. Thus, a direction in which the payload travels is changed using the cross truss.

In another aspect, a transportation node system orbits a celestial body. The system includes a truss having two ends with at least two coupling cable tips. The truss, while orbiting the celestial body, rotates around its center of mass in a direction to control the coupling cable tips in relation to a surface of the celestial body and to cancel a relative velocity between the coupling cable tips and the surface for coupling cable tip transfers to and from the surface.

The system can also include a rail gun, tower accelerator, forward velocity cart, rocket sled, and/or mass driver to match velocities at tether tip transfers at a surface of the celestial body and to minimize impact when a payload is transferred from one of the tether tips to the surface of the celestial body.

Each tether tip further can include a tether tip frame attached to the truss via the tether. The tether tip frame has a storage section for storing payloads, and a secondary tether that engages payloads.

In yet another aspect, a re-entry system enables bulk cargo landing through an atmosphere. The system has a payload platform for supporting multiple payloads; a steering mass; and a spin control mass. The system also has at least one ram air stabilized lifting wing causing a rotational force to be balanced with at least re-entry atmospheric density forces to allow the steering mass and spin control mass to adjust at least a rate of descent for successful re-entry of the payloads. The system can also include payload shrouds salvaged from prior launches and re-used to absorb a portion of the heat of re-entry.

BRIEF DESCRIPTION OF THE DRAWINGS

The above and other objects, features and advantages of the present invention will be made apparent from the following description of the preferred embodiments, given as non-limiting examples, with reference to the accompanying drawings.

FIG. 8A is a side view showing a load pickup forward velocity enhancement option to reduce the tether impact for the lunar surface pickup using a lunar platform tether, according to an aspect of the present invention.

FIG. 8B is a side view showing another load pickup forward velocity enhancement option to reduce the tether impact for the lunar surface pickup using a lunar platform tether, according to an aspect of the present invention.

FIG. 8C is a side view showing another load pickup forward velocity enhancement option to reduce the tether impact for the lunar surface pickup using a lunar platform tether, according to an aspect of the present invention.

FIG. 8D is a side view showing yet another load pickup forward velocity enhancement option to reduce the tether impact for the lunar surface pickup using a lunar platform tether, according to an aspect of the present invention.

FIG. 8E is a side view showing still another load pickup forward velocity enhancement option to reduce the tether impact for the lunar surface pickup using a lunar platform tether, according to an aspect of the present invention.

DETAILED DESCRIPTION OF EMBODIMENTS

Embodiments of the present invention will be described below with reference to the drawings.

U.S. patent application Ser. No. 10/862,604, which was filed by the current inventors on Jun. 7, 2004, is incorporated by reference herein in its entirety. Such application discloses a space transportation system including small, unmanned vehicles that transfer fuel tanks and payloads in Earth orbit, to allow for further transport to a lunar orbit or to the surface of the moon. The application describes a method for greatly increasing the range of relatively small unmanned space vehicles by providing mobile refueling platforms or transportation nodes in space. These mobile platforms, also known as propellant transporters, can rendezvous and dock with space vehicles traveling to the moon, for example, and replenish their depleted propellant reserves. The present disclosure includes equipment to transfer payloads between two space platforms or vehicles, and describes a reliable procedure to effect such transfers.

The term platform as used herein refers to both stationary deployed platforms (without propulsion systems) after discard from an initial transportation system as well as transport platforms (or vehicles) which have their own propulsion systems (such as thrusters, engines and motors). Further, such platforms may be manned or unmanned.

The term payload as used herein refers to any of a cargo by itself, a pallet or payload carrier having cargo secured thereto, or a cargo or payload container having cargo therein. In other words, a payload can include any item that needs to be transported or stored in space, as well as any hardware such as supports or containers associated with such items.

Figure 1:
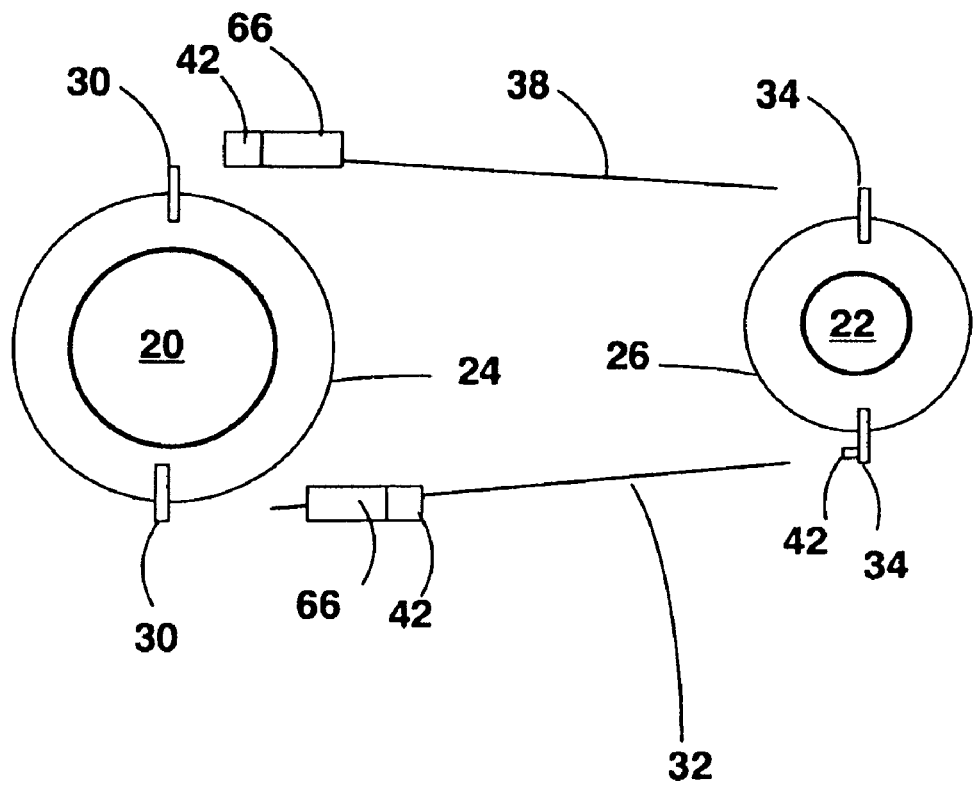
FIG. 1 illustrates a prior art system including two transportation node platforms used in tandem in orbits around celestial bodies, creating the momentum transfer enhancement of payloads and support of space transportation.

FIG. 1 depicts Earth 20 in relation to the moon 22 with orbits around each celestial body. Low Earth orbit 24 is the destination of space transportation vehicle 66 journeying from Earth 20 to low Earth orbit 24 on an Earth to low Earth orbit trajectory 32, where it interfaces with Earth transportation node 30, and replenishes and/or consolidates the components required for the trip to moon 22.

Space transportation vehicle 66 travels toward moon 22 on Earth to moon trajectory 32 in a direction so as to interface with lunar transportation node 34 in lunar orbit 26. Space transportation vehicle 66 is replenished at lunar transportation node 34 and departs for the surface of the moon 22 on a lunar orbit to moon's surface trajectory. Space transportation vehicle 66 lands on the moon 22 and delivers the payload 42, and may be abandoned on the moon surface 22 or launch from the lunar surface 22 to the lunar transportation node 34 in lunar orbit 26. Space transportation vehicle 66 is replenished at lunar transportation node 34 and departs for Earth 20 on a moon to Earth trajectory 38 with a new payload 42. Space transportation vehicle 66 interfaces with Earth transportation node 30, where it replenishes and/or consolidates the components required for the next trip to the moon 22. Space transportation vehicle 66 interfaces with Earth transportation node 30, where it may transfer payloads, if required and acquire a new payload 42 required for the next trip to moon 22.

Figure 2:
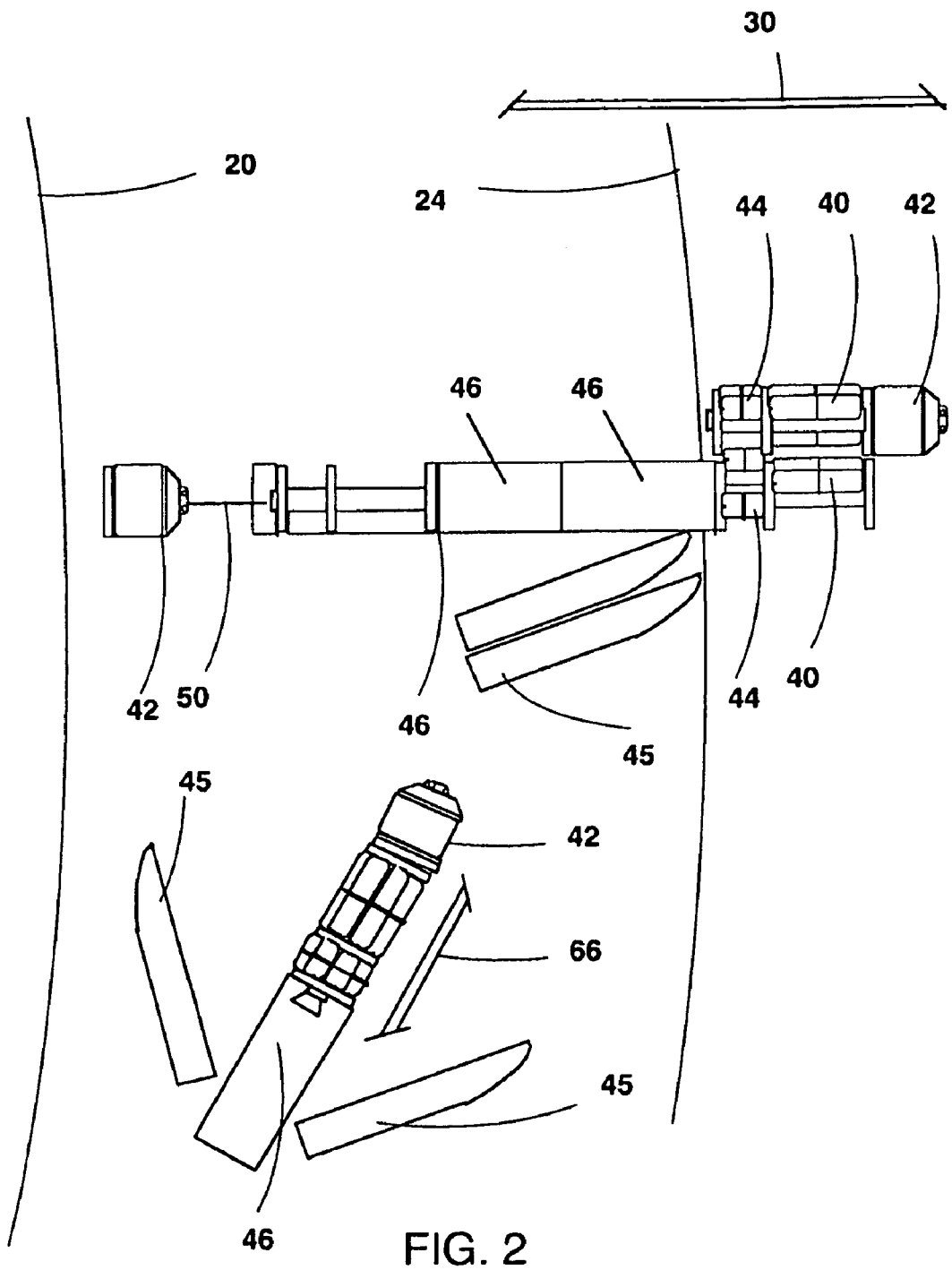
FIG. 2 is a view of an exemplary commercial transportation segment of a lunar transportation system with a vehicle loading propellant tanks in low Earth orbit, according to an aspect of the present invention.

FIG. 2 shows an exemplary space transportation vehicle 66 in a structural rack subsystem with replaceable fuel tank 40 and replaceable oxidizer tank 44 all launched and protected by disposable shroud 45. This combination payload is transported on Earth launch vehicle stage 46, which is designed to push up through the Earth atmosphere and is disposable. Earth launch vehicle stage 46 first places the space transportation craft 66 in low Earth orbit 24 and detaches the space transportation craft 66 for the trip to moon 22 on Earth moon trajectory 32, from Earth 20. Later Earth launch vehicle stage 46 finds and rendezvous with a returning space transportation craft 66. As disposable Earth launch vehicle stage 46 and other components of the operation become available in low Earth orbit 24, a node is evolved and becomes a storage and replenishment location in low Earth orbit 24. As the mass increases in the orbital altitude and inclination of low Earth orbit 24, then a mass significant Earth transportation node 30 can evolve with the increased transportation market.

Earth transportation node 30 can become a logistics location above Earth 20 in low Earth orbit 24 and a replenishment logistics location for trips to the moon 22. Reusable returning space transportation craft 66 can drop off for reuse, the previously disposable fuel tanks 40 and oxidizer tanks 44 Eventually new larger shrouds 45 are saved and used in a bulk re-entry device discussed later. The mass of the Earth transportation node 30 gradually increases to a significant amount and the length 50 becomes longer to provide a gravity gradient stable node for tether 50 and advanced payload operations. Earth transportation node 30 matures as a node just like a city or harbor does on Earth with humans, transportation services, enhancement of payloads 42 using a tether 50, and propellant services for space transportation craft traffic.

Figure 3:
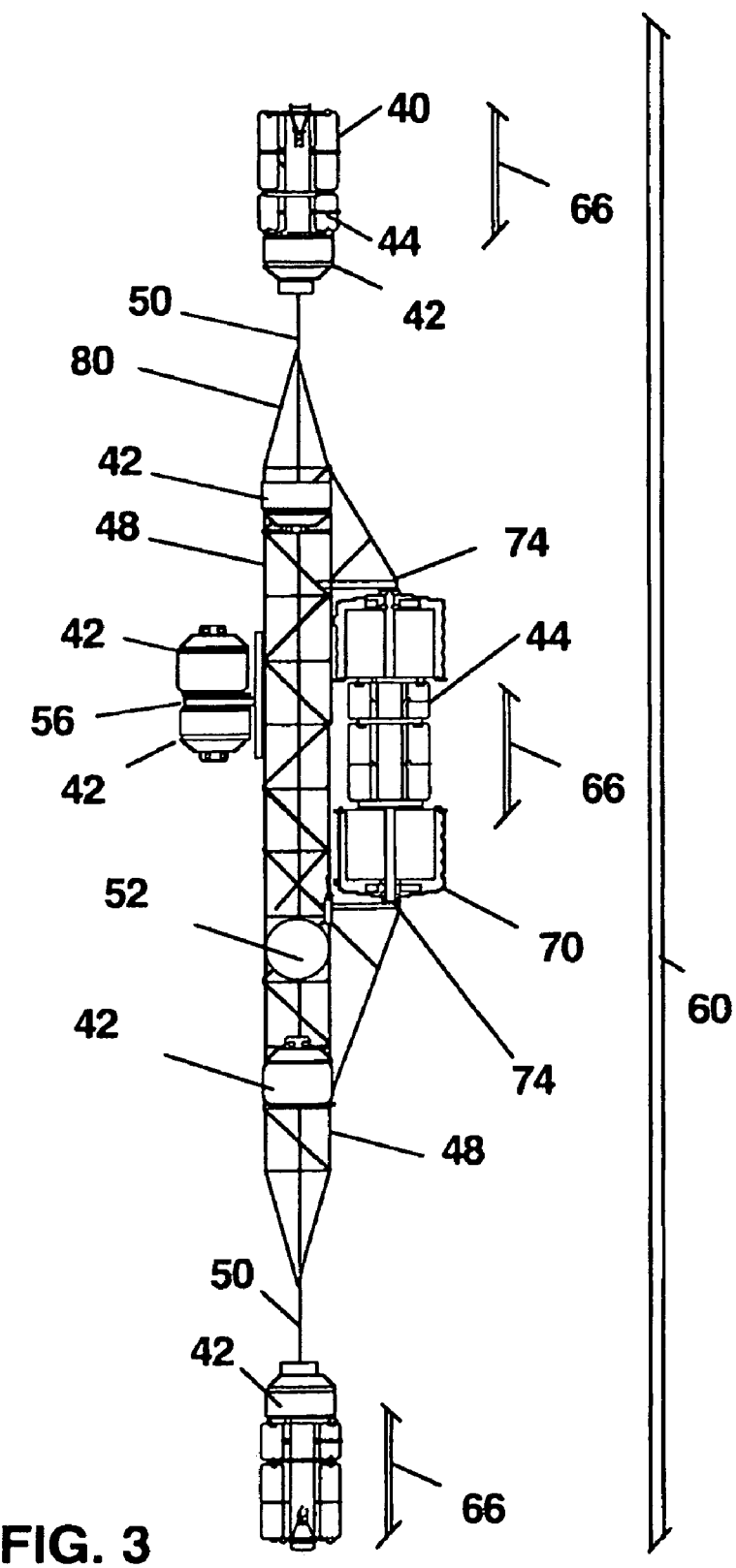
FIG. 3 is a side view of the transportation node platform with tether systems having a substantially longer axis pointing toward the center of the mass of the celestial body it orbits, according to an aspect of the present invention.

FIG. 3 depicts an advanced Earth transportation node 60 in an early evolution before significant human accommodations are introduced. The node is advanced because it begins to offer commercial transportation services and it becomes a destination point for changing the mode of transportation, similar to a harbor or airport.

A series of truss sections 48 are added to discarded hardware, a tether 50 and a tether cable reel 52 to become an advanced transportation node 60 in low Earth orbit 24. The transition to reusable cryogenic tanks is stimulated by the capacity to store cryogenic tanks on structural rack subsystems in a full sized space transportation craft 66. A large thermal protection insulation 70 is mounted on a turntable 74 with a structural brace with the capability of enclosing and cooling an entire space transportation craft 66 with active cooling equipment.

Payloads 42 are transported and stored along the advanced transportation node 60 length with the help of a payload elevator 58. Payloads 42 are stored on the truss sections 48 and payload 42, fuel tanks 40 and oxidizer tanks 44 are transferred at will robotically on advanced transportation node 60.

In one embodiment, tether operations are introduced when the Earth transportation node 60 and the lunar transportation node 34 combined mass reach approximately 30 times the average mass of payload 42 and space transportation craft 66 combined. For example, if the average mass of payload 42 and space transportation craft 66 is 100,000 pounds or 50 tons, then the combined mass of Earth transportation node 60 and the lunar transportation node 34 should be 1500 tons or 750 tons per node.

For example, if the average mass of payload 42 is only 10 tons and payload 42 is the only item enhanced by tether related momentum exchange, then the combined mass of Earth transportation node 60 and the lunar transportation node 34 should be 150 tons or 75 tons per node. This is approximately 30 tons per one ton of payload enhanced at the two nodes combined. The conclusion is tether enhanced momentum exchange requires a gradually increasingly mass heavy node.

Figure 4A:
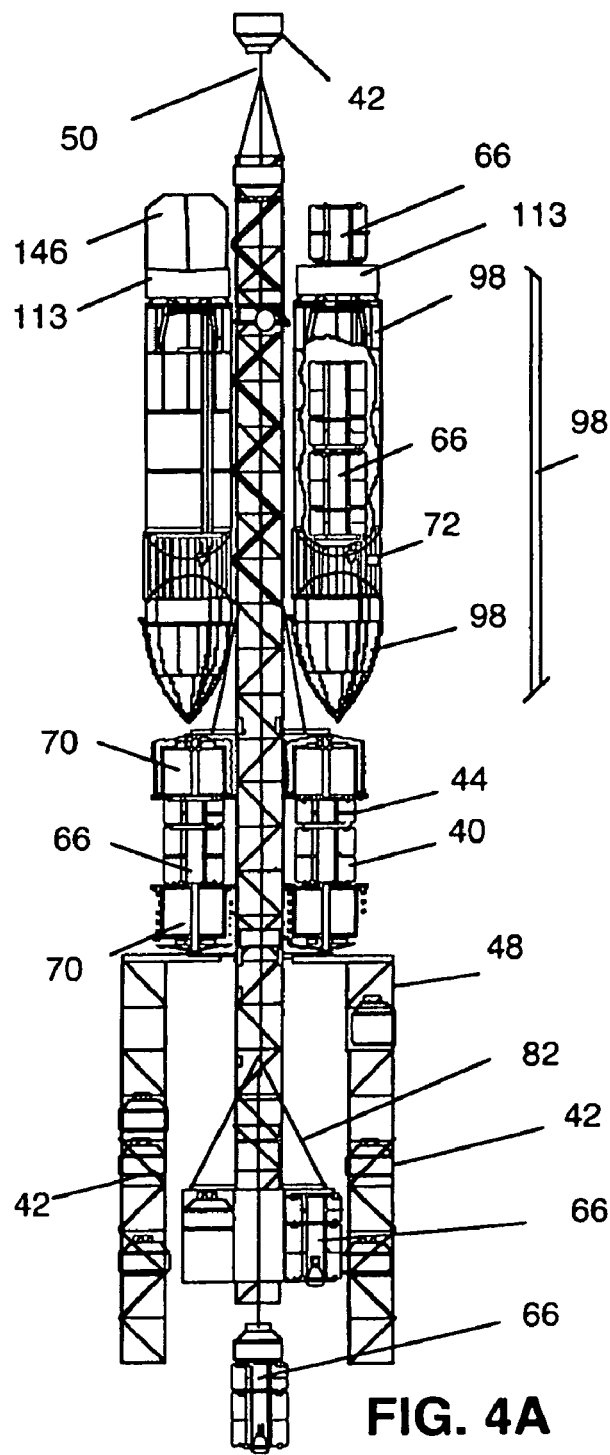
FIG. 4A is a side view of the transportation node platform with an external tank added for mass near the center of the mass of the platform, according to an aspect of the present invention.

FIG. 4A depicts a side view and describes a more capable advanced transportation node 60 that implements a tether system to enhance the weight of payload 42 first and eventually to enhance the weight of payload 42 and the space transportation craft 66 combined. The mass required can come from lunar surface mass, water transported from Earth, the salvaged external tank 98 of the space shuttle, and/or other metal hardware such as hardware discarded from Earth 20.

The transportation node 60 can gain mass in a number of ways and can including propellant storage in thermal protection insulation enclosures 70 with active cooling equipment 72, consistent with good storage practices of balancing the supply on hand with the cost and degrading of the propellants.

Rather than moving liquid for storage an aspect of the present invention contemplates storing moveable tanks. For example, the ET 98 can store multiple space transportation crafts 66. Large hatch kit 113 seals the volume and active cooling equipment 72 removes heat from the enclosed volume. This system increases the duration for storing cryogenic propellants in space. An alternative cooling system includes a large thermal protection insulation 70 mounted on a turntable 74 with a structural brace having the capability of enclosing and cooling an entire space transportation craft 66 with active cooling equipment. These systems do not require breaking a seal on the storage tanks, eliminating the introduction of extra heat into cryogenic systems. Large hatch kit 113 provides large diameter access (e.g., at least 25') to the interior of the ET 98.

The advanced transportation node 60 with tether capabilities adds additional truss sections 48 and the salvaged external tank 96. The structural frame and subsystems with fuel tank 40 and oxidizer tank 44 are small enough to fit within the external tank's fuel tank providing a 53,000 cubic foot interior pressure volume tested to 43 psia.

Figure 4B:
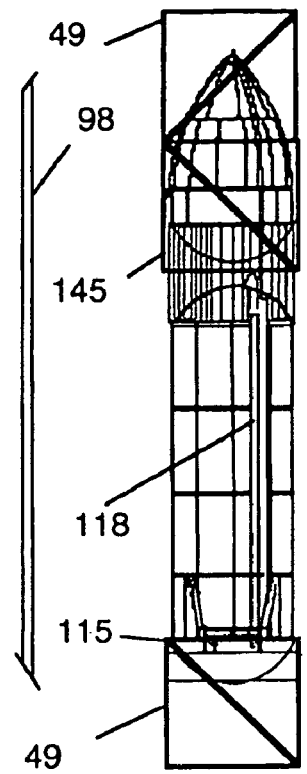
FIG. 4B is a side detail view of the transportation node platform with a special sized truss to exploit the strength and stiffness of the external tank added for mass near the center of the mass of the platform, according to an aspect of the present invention.

FIG. 4B depicts a side view and describes a larger truss unit 49 designed to exploit the strength and affordability of the ET 98. A salvaged 25-ton external tank 98 of the space shuttle provides 58,000 pounds of mass to the increasingly capable advanced transportation node 60. To effectively use this mass, a larger truss section 49 for the ET 98 is used to structurally attach the ET mass within the more capable advanced transportation node 60 to effectively enhance payloads and later entire vehicles at the Earth transportation node 30 and the lunar transportation node 34.

Salvaged external tanks 98 of the space shuttle can, for example, provide mass for the momentum transfer operations. Four salvaged 25 ton external tanks 98 of the space shuttle could provide 100 tons of ballast and gravity gradient stability in orbit. The extra mass of the truss section 48 and truss unit for ET 49 provides the rest of the mass required.

Salvaged external tanks 98 of the space shuttle are unique in several ways. First, the stiffness of the salvaged external tanks 98 of the space shuttle is significant when compared to truss sections 48 and the truss unit for ET 49. Second, mass is critical and the external tank 96 is 58,000 pounds of mass worth at least $580 million of invested transportation cost This means transporting a similar mass from Earth would cost at least $580 million of transportation cost. Third, the structural length of 154' and large size provide long sections of the node that do not require truss units for ET 49, and truss unit for ET 49 is designed to be attached directly to the ET 98 and derives more than enough strength to manage the massive weight related to the ET 98. The attach points are engineered to use the existing heavy points 145, 115 on the ET 96 to exploit its strength and length. The truss section for ET 49 takes advantage of attaching to aft orbiter hardware (not shown) attachment points near the aft end of the ET 98 and the aft solid rocket booster hard points 115. A forward solid rocket booster hard point 145 also provides the truss for ET 49 with attachment points for the advanced transportation node 60.

Fourth, the mass is useful and when combined with the truss unit for ET 49. The combined weight is approximately 30-tons of mass. Hard points 145, 115 provide strength on the ET 98. Five external tanks can enhance 10-ton payloads at each node. Twenty-five external tanks can enhance a 10-ton payload and a 100,000-pound vehicle capable of moving on to other celestial destinations.

Fifth, each ET 98 has a 27' diameter hydrogen tank tested to 40 psia and capable of providing shelter for payloads 42, space transportation craft 66, and inflatable inserts for habitation using 25' diameter hatch kit in combination with aft cargo carrier (ACC) 146. Aft Cargo Carrier (ACC) 146 can be a 27' diameter by 34' long pod attached to the aft end of the ET 98. Aft Cargo Carrier (ACC) 146, doubles the cargo or payload volume of the space shuttle, and provides a key to the use of the ET 98 in space for other purposes beyond its initial use as a 8.5 minute propellant container. External propellant lines 118 can be reused for other purposes, discussed later.

Sixth, salvaged external tanks 98 of the space shuttle provide a concentration of mass and the ability to move that contained mass along the length of the advanced transportation node 60. The two tanks of the ET 98 are approximately 72,000 cubic feet in volume and filled with water or lunar soil have a mass of approximately 2,200 tons. Applications of this potential advantage are discussed later.

Figure 5:
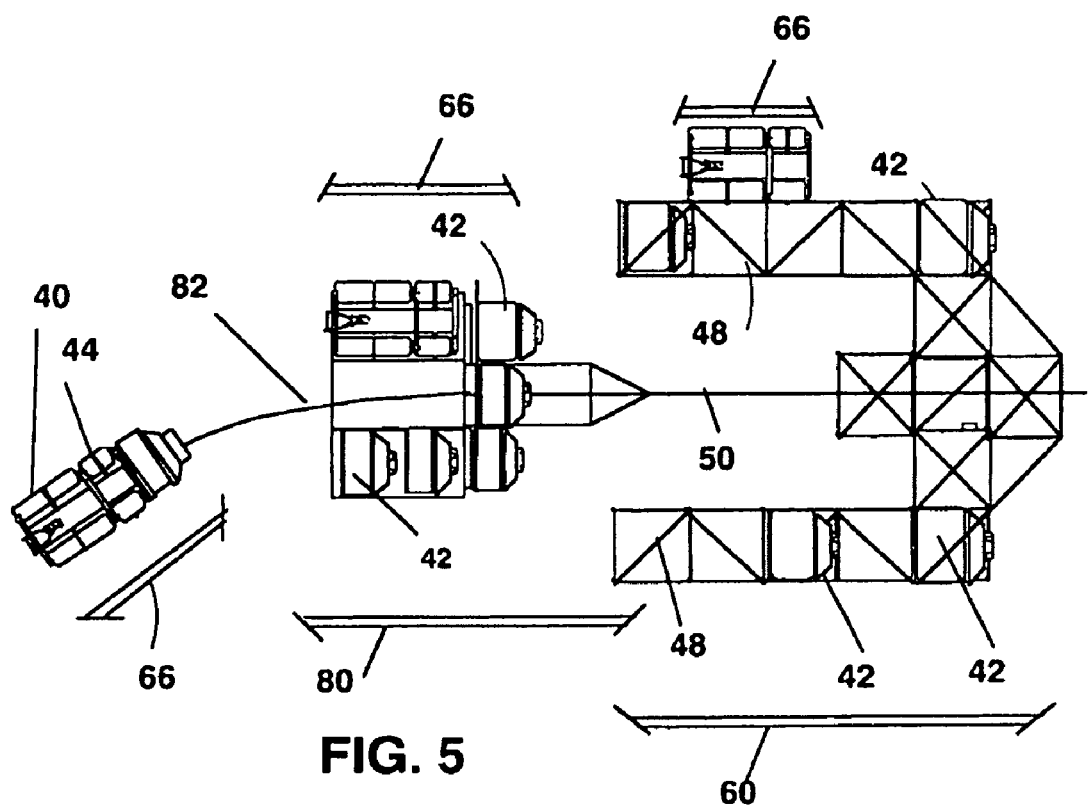
FIG. 5 is a side view of an end portion of a platform and a tether tip portion with multiple payloads in a transfer frame, according to an aspect of the present invention.

FIG. 5 depicts the tether tip frame 80 including a secondary tether 82. The secondary tether 82 supports space transportation craft 66 and is supported by the frame 80 above, which is attached to truss section 48 of the transportation node 60. Each tether 50 is capable of changing location and reeling in or out with a mass in operations designed for rendezvous, docking and berthing. The tether tip frame 80 has storage and transfer capabilities for payloads 42, oxidizer tank 44 and fuel tank 40. The tether tip frame 80 has the ability to be drawn up to advanced transportation node 60 for many reasons including the transfer and storage of payloads 42 and cargo.

The advanced transportation node 60 has the ability to extend and retract the tether 50 from each end, for example up to 30 KM. The secondary tether 82 can extend and retract from the secondary tether tip 80, which can also extend and retract from the node 60. Once retracted, payloads 42 can easily be transferred among the truss structures 48.

Advanced transportation node 60 has the ability to attach and detach payloads 42 and other mass using a maneuvering tether tip. Advanced transportation node 60 with tether 50 also has the ability to propel and swing payloads 42 and other mass. This ability to propel and swing payloads 42 and other mass coupled with the ability to release and capture mass by maneuvering tether tip devices offers potential energy savings and other benefits.

Figure 6:
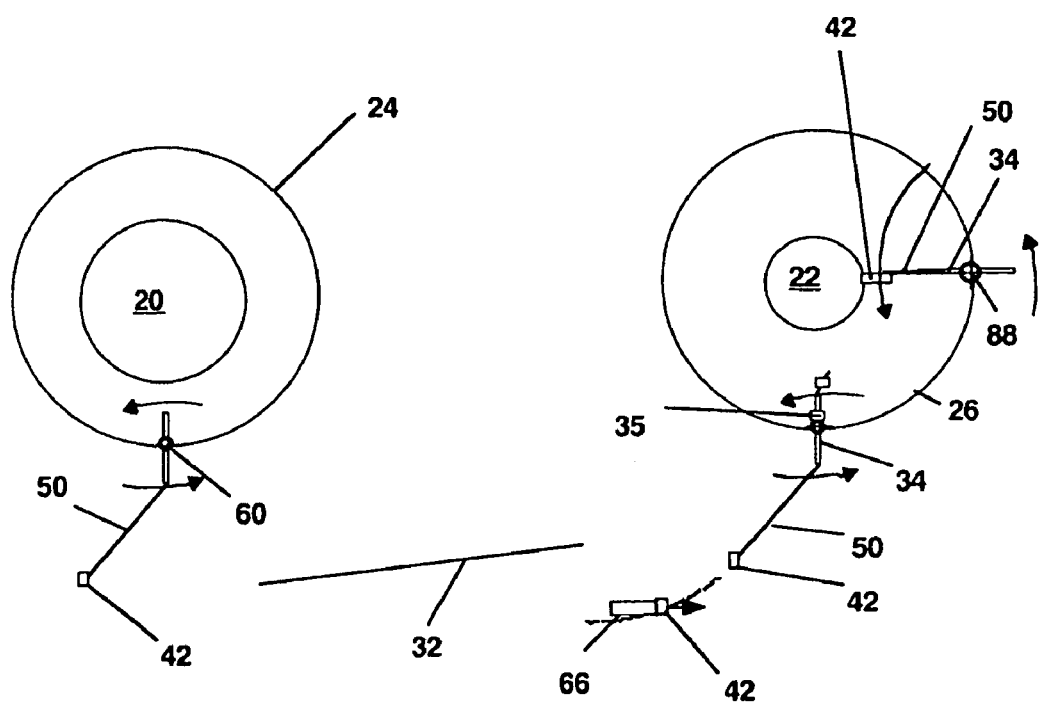
FIG. 6 illustrates a forward rotating embodiment of the lunar orbit transportation node platforms, according to an aspect of the present invention.

Referring to FIG. 6, advanced transportation nodes 60 work in tandem to transfer payloads among themselves. Forward rotating transportation node 60 (which rotates end over end around its center of mass) allows for the capture and release of payloads 42 and other heavier mass objects consistent with the mass of the platform. The transfer allows for the conversion of momentum in a straight line to angular momentum around a planet when releasing payloads 42 and other heavier mass objects.

More capable advanced transportation node 60 at lunar transportation node 34 can be further enhanced by the addition of International Space Station (155) components 35. This and other methods are used to introduce a manned aspect to the previous almost unmanned transportation nodes.

In one embodiment, the node 60 adjusts its center of mass to enhance the capability. Each node 60 can control its individual transportation node center of mass 88 with several methods, including moving mass or water along the tether platform length, as discussed earlier. Also, a forward rotating node 60 can change to a backward rotating node.

Backward rotating transportation node 60 (backward rotation not shown in the Figure) allows for the capture and release of payloads 42 and other heavier mass objects consistent with the mass of the platform. The capture and release in low Earth orbit 24 and in lunar orbit 26 could use either end on the backward rotating transportation node 60. The transfer allows for the conversion of momentum in a straight line to angular momentum around a planet and also the reduction of lunar surface velocity to near zero for a tether payload drop off on the lunar surface by matching and countering the relative velocity of the tether tip in relation to the moon surface.

Figure 7A:
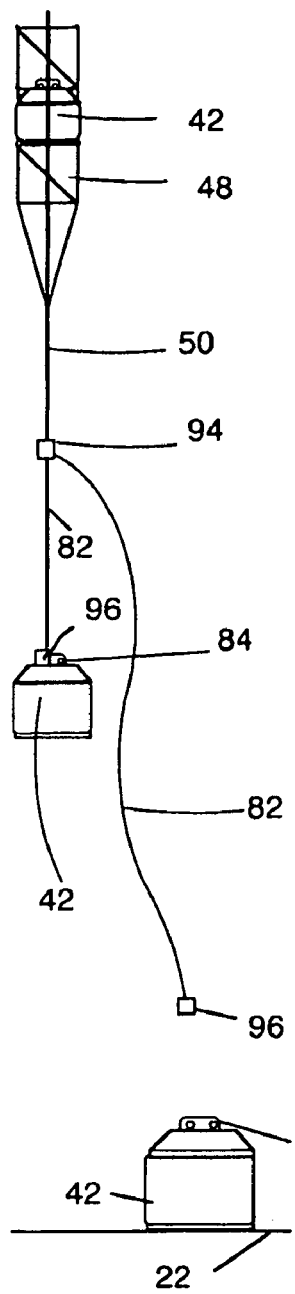
FIG. 7A is a side view showing a start of a pickup operation embodiment on the lunar surface using a lunar platform tether, according to an aspect of the present invention.

FIG. 7A depicts the dropping of a payload 42 using a technique of matching the forward surface velocity of the tether tip delivery system hooked to the tether platform to cancel the backward rotating transportation node velocity. Thus, the system is capable of setting down cargo at near zero relative surface velocity. The tether 50 is attached in orbit to truss section 48 and some type of transportation node in orbit capable of storing payloads 42. The tether 50 has a tether multiple joint 94 supporting secondary tethers 82 with tether seeker attachments heads 96. Tether seeker attachments heads 96 have the capability to seek, maneuver to and capture with structural attachment, payload carrier top for tether attachment 84, which is capable of attachment to most standard payload carrier tops. FIG. 7A depicts tether seeker attachment head 96 maneuvering to larger payload carrier top for tether attachment 84. In the background, smaller payload 42 is preparing to set down almost vertically on the moon surface 22 at near zero forward velocity.

Figure 7B:
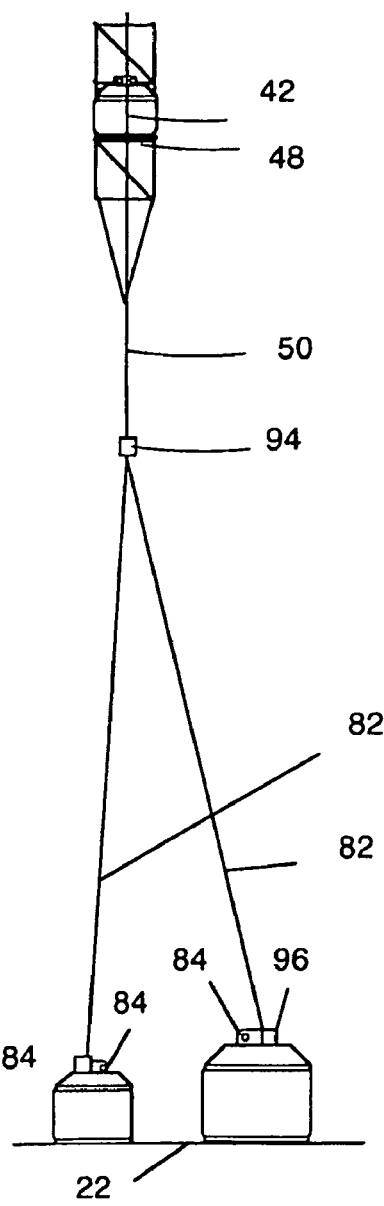
FIG. 7B is a side view showing a load transfer of the pickup operation embodiment on the lunar surface using a lunar platform tether, according to an aspect of the present invention.

FIG. 7B depicts the tether seeker attachment head 96 attaching to the larger payload 42 with the carrier top for tether attachment 84, while the smaller payload 42 is set vertically down on the moon surface 22 at near zero forward velocity.

Figure 7C:
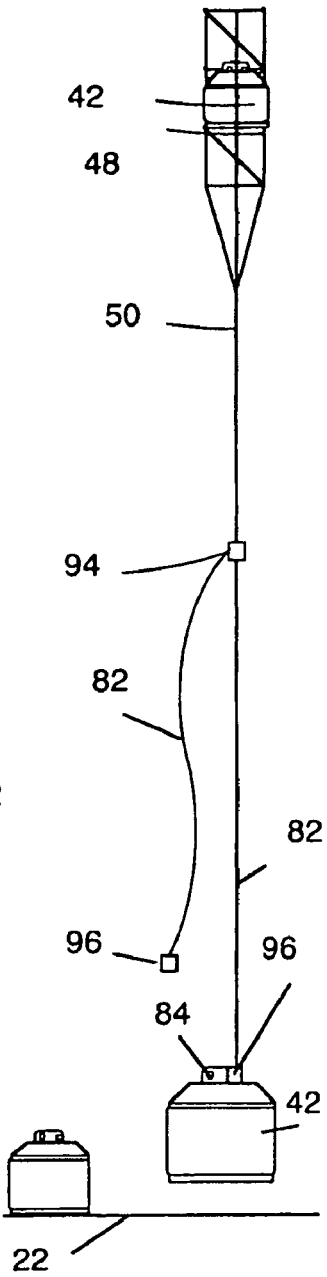
FIG. 7C is a side view showing a load pickup of the pickup operation embodiment on the lunar surface using a lunar platform tether, according to an aspect of the present invention.

FIG. 7C depicts the tether seeker attachment head 96 detaching from the smaller payload 42 with the carrier top for tether attachment 84, while the larger payload 42 is raised upward from the moon surface 22 at near zero forward velocity. The load is minimized by the careful transfer of the load from one attached mass to another so as to minimize the actual load difference on the tether cables.

FIGS. 8A-8E depict exemplary methods of reducing the impact loading on the tether cable 50 from a dead lift from the moon surface 22. Tether technology is still limited by the material's strength and the ability of payload carrier top for tether attachments 84 for the foreseeable future.

FIG. 8A depicts the tether 50 connected to the tether seeker attachment head 96 picking up a dead weight payload 42 from the moon's surface 22, potentially breaking the tether 50 with the impact loading of the rapid pickup operation. In this example, the impact is reduced by a forward velocity cart 100 timed to minimize impact loading on the tether 50.

FIG. 8B also depicts the tether 50 connected to the tether seeker attachment head 96 picking up a dead weight payload 42 from the moon's surface 22. In this example, a rocket sled 102 propels upward reducing impact loading on the tether 50.

FIG. 8C also depicts the tether 50 connected to the tether seeker attachment head 96 picking up a dead weight payload 42 from the moon's surface 22. In this example, a mass driver sled 104 propels upward reducing impact loading on the tether 50. The mass driver sled 104 is particularly useful with small payloads.

FIG. 8D depicts the tether 50 connected to the tether controller 106, which is connected through a secondary tether 82 to the small payload 42. The system gently places the small payload 42 on the moon surface 22. Before releasing the small payload 42, the tether seeker attachment head 96 seeks, connects, attaches and takes up the slack on the large payload 42. The tether controller 106 balances the load and transfers the load from the small payload 42 to the large payload 42, so as to lesson the impact load and minimize the change in load the tether 50 feels to a portion of the difference in the two payload masses. Quick coupling is facilitated by payload carrier top for the tether attachment hardware 84.

FIG. 8E depicts the tether 50 connected to the tether seeker attachment head 96 picking up a dead weight payload 42 from the moon's surface 22. A tower accelerator 110 propels the tower in a circular fashion to lessen the impact while the tether seeker attachment head 96 seeks, connects, attaches and takes up the slack on the payload 42. The tether load transfer device 110 times and transfers the load to lessen the impact load and minimize the load the tether 50 feels.

Figure 9:
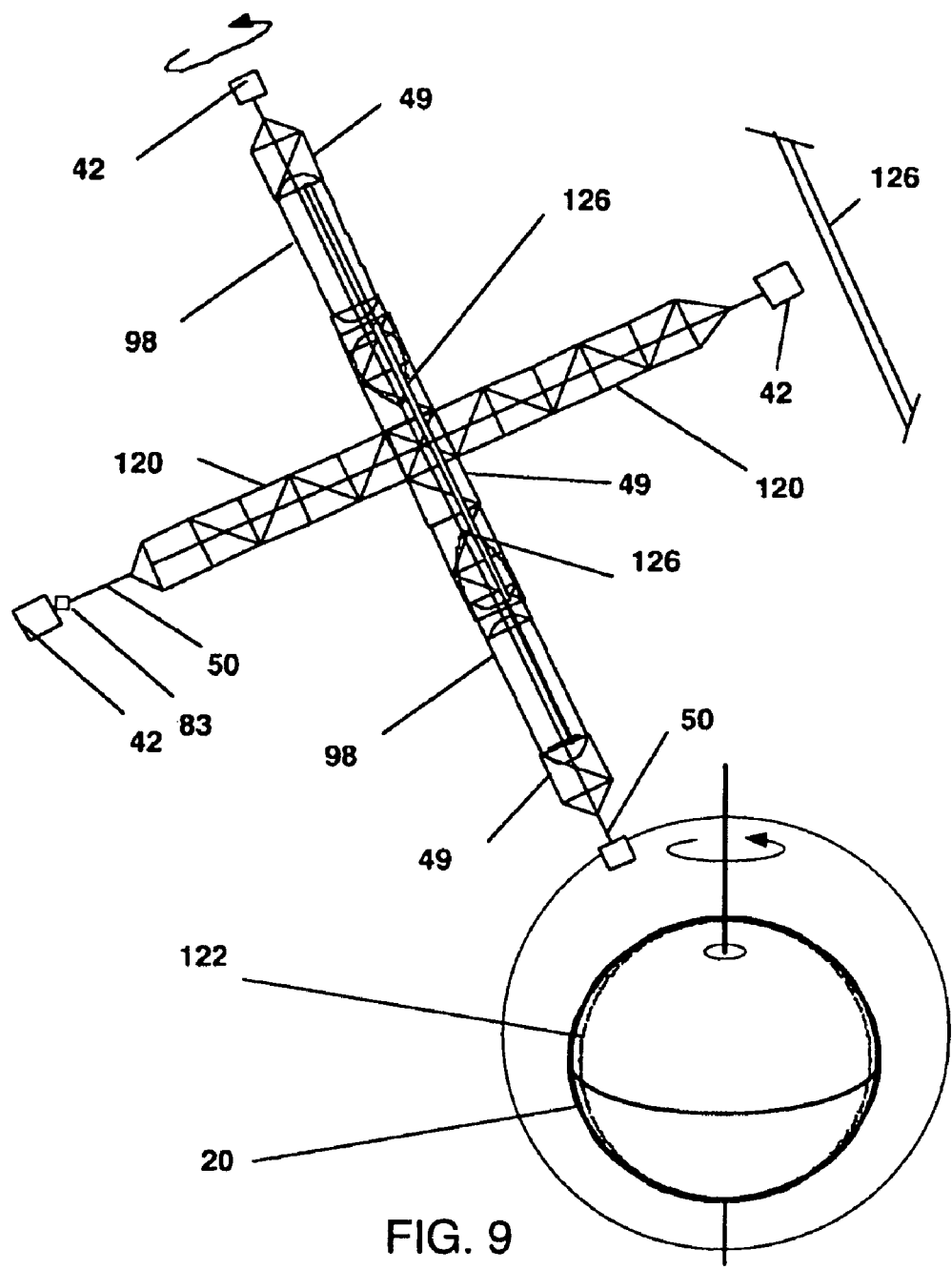
FIG. 9 is an Earth view showing the transportation node with center of gravity location change and orbital inclination placement cross truss, according to an aspect of the present invention.

FIG. 9 depicts Earth 20 with respect to a perfect sphere 122. As is well known, an approximately 21 km difference exists between the diameter of Earth at the equator and the diameter of Earth at the poles. The advanced transportation node 60 with the salvaged external tank 98 of the space shuttle can include piping 126 to move mass along the advanced transportation node 60 by moving fluids or mass to change the center of mass of the advanced transportation node 60. Changing the center of mass effectively uses the oblate spheroid shape of Earth 20 and/or variations in magnetic properties of Earth 20 or other celestial bodies like the moon 22 to pump or push off the body for beneficial purposes. In one embodiment, the 17' propellant lines of the ET 98 are used to transfer liquids for changing the center of mass.

The advanced transportation node 60 can contain truss sections 48 and truss units for ET 49 to provide the structural rigidity and length required to support salvaged external tanks 98 of the space shuttle, payloads 42, a cross truss 120 and other mass to enhance the transportation cycle. The cross truss 120 may be rigidly attached to the truss sections 48. The cross truss 120 can rotate around the long axis of the node 60 to create a cross truss rotating platform that can propel payloads 42 into other orbital inclinations after commanded release from the tether tip 83. The cross truss 120 can also include a tether 50 and all of its associated functionality, as described throughout this specification. In one embodiment, the cross truss along with the rest of the node 60 naturally spin one revolution once every orbit.

FIG. 10 shows a re-entry configuration provided to satisfy the requirements for bulk cargo landing of materials from the moon to the Earth. The platform can be expanded in orbit, loaded with cargo or payloads 42 and de-orbited. As the package descends, a balance between the rotational aerodynamic lift and the re-entry forces is created to permit a safe re-entry low heating landing of large bulk cargo on the surface of the Earth.

Figure 10A:
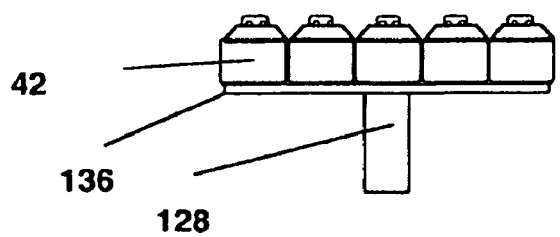
FIG. 10A is a side view showing a bulk re-entry payload in orbit with an undeployed re-entry device, according to an aspect of the present invention.

FIG. 10A depicts payloads 42 combined and connected with a payload platform for re-entry 136 and with a re-entry device transportation container 128 in low Earth orbit above the atmosphere of Earth. The container 128 has mass, and protects delicate components from a launch process, and is shown not deployed in FIG. 10A. The platform is a compressed truss structure, acting as a pallet for the attachment of payloads 42.

Figure 10B:
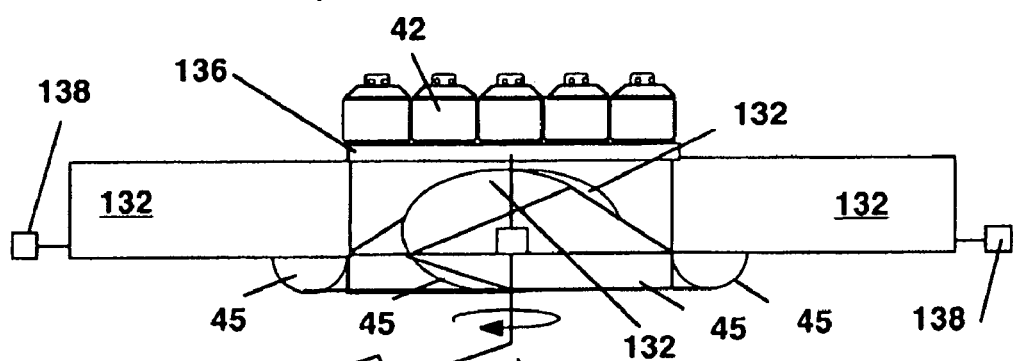
FIG. 10B is a side view showing the bulk re-entry payload in orbit with a deployed re-entry device with variable aerodynamic lift and tether steering mass, according to an aspect of the present invention.

FIG. 10B also depicts payloads 42 combined and connected with the payload platform for re-entry 136. In FIG. 10B, ram air stabilized lifting wings 132 are shown inflated and rigidized. Originally, the deflated wings 132 were compressed and stored in the container 128, and can be inflated as they move through the atmosphere. Also deployed is a rigid steering mass 134 (such as the container 128) and a spin control mass 138. The spin control mass 138 creates a centrifugal force that adjusts the wings 132 for optimum re-entry, minimizing re-entry heating. The spin control mass 138 controls the amount the wings are inflated based upon a ram air parachute principle. One end of the wing can have mass to provide this feature. Alternatively, the spin control mass 138 could extend from the edges of the wings 132 with a cable. The rigid steering mass 134 is located on a rigid steering boom 135 that enables adjustment of the re-entry angle with respect to the atmosphere. Thus, at least two mechanisms for controlling re-entry are provided.

Figure 10C:
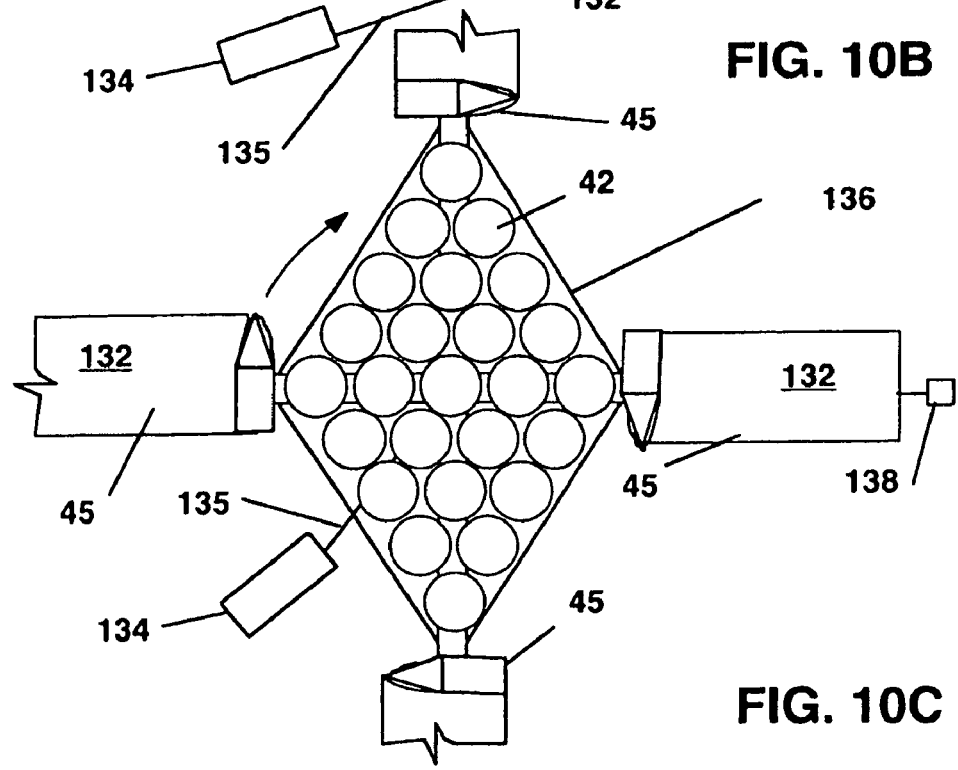
FIG. 10C is a top view showing the bulk re-entry payload in orbit with the deployed spinning re-entry device, according to an aspect of the present invention.

FIG. 10C depicts payloads 42 combined and connected together with the payload platform for re-entry 136. The deployed ram air stabilized lifting wing 132 causes a rotational force to be balanced with re-entry, atmospheric density and other forces to allow a tether steering mass 134 and spin control tether mass 138 to adjust a rate of descent and other factors for a successful re-entry of bulk mass and payloads 42. Payload shrouds 45 can be salvaged from launches up from Earth and re-used to absorb some of the heat of re-entry from the leading edges of the wings 132. Preferably they are located at the points of maximum re-entry heating.

Breakage of the tether cable is a danger in orbital operations. Sub-nodes can be provided to reconnect a broken tether. For example, sub-nodes on either side of the break can propel themselves to close with and attach with each other. The sub-nodes can re-connect and repair the broken tether.

The type of cable repair depends on the type of cable used. In one embodiment, a multiple cable or tape is used with interconnecting smaller stands to take up the load if one cable is severed. Repair of this type of cable includes a film applied over the entire break of the tether cable and allows the operation to continue quickly.

Figure 11:
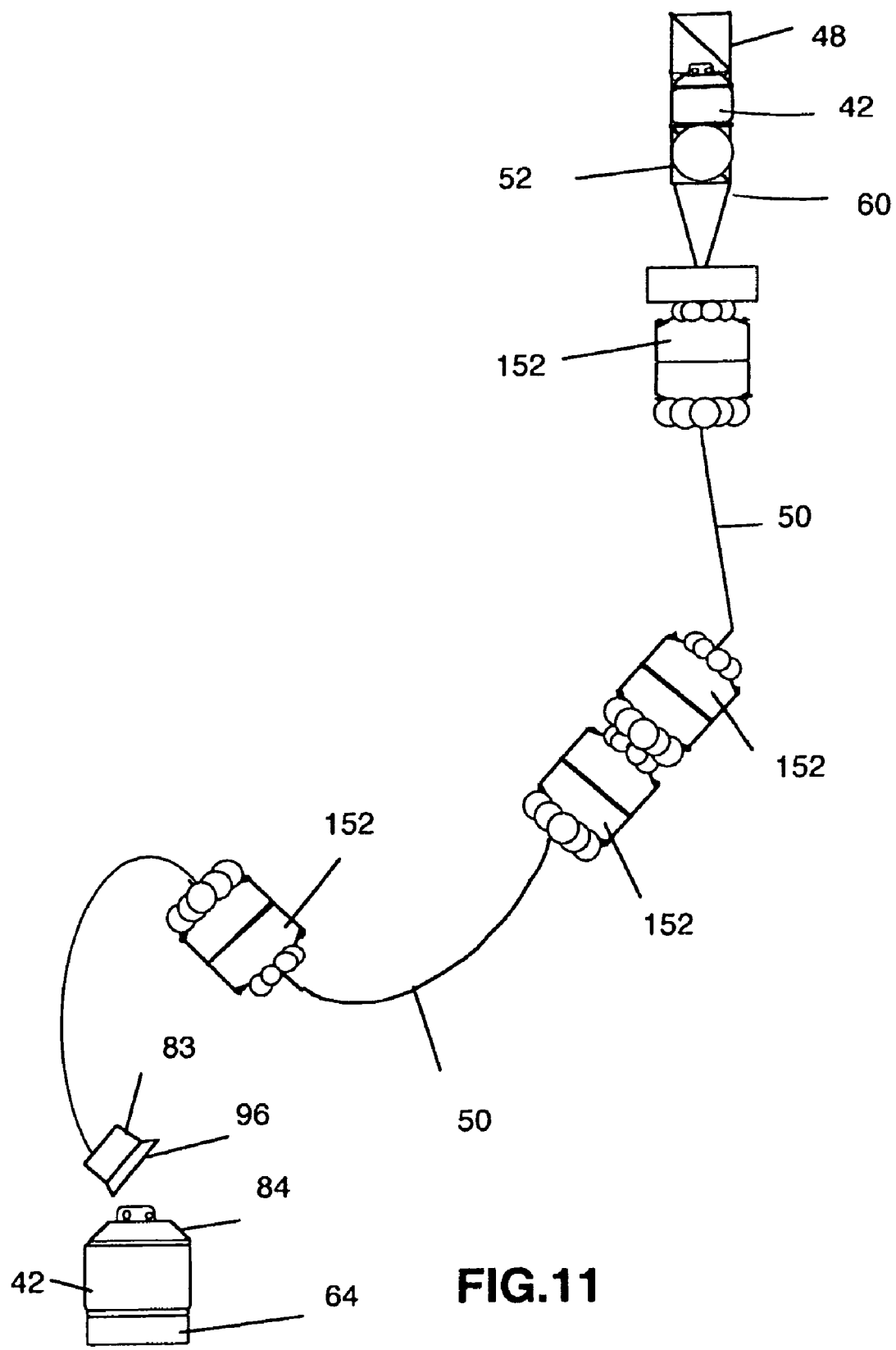
FIG. 11 is a side view showing a tether seeker tip load pickup with tether sub-nodes in various positions, according to an aspect of the present invention.

FIG. 11 depicts the truss section 48 with payloads 42 in storage on the advanced transportation node 60 with a tether reel 52. Attached by the tether 50 are a series of tether sub-nodes 152 with the capability of movement along the tether 50 by reeling in and out and by other propulsive means. At one end of the tether 50 is a maneuvering tether tip and tether seeker attachment head 96, which is capable of seeking, moving to and attaching to the payload carrier top for tether attachments 84 of the payload carrier 42.

Payload carrier top for tether attachments 84 is a top of a containerized system that consists of a structural tether attachment point and enough structure to attach to a variety of structural points on a payload 42. The payload 42 could be a habitation volume, a tank, etc. The payload carrier top for tether attachments 84 is compatible with a large variety of different payloads 42. A standard space container pallet 64 can also be provided. The pallet 64 is also compatible with a variety of different types of payloads 42. It operates as a standard lifting base provided under each payload 42. In one embodiment the pallet 64 is incorporated into the payload 42. In another embodiment, the pallet 64 is a separate structural attachment. An exemplary pallet 64 is described in U.S. patent application Ser. No. 11/076,950, in the names of W. KISTLER et al, filed on Mar. 11, 2005.

Figure 12:
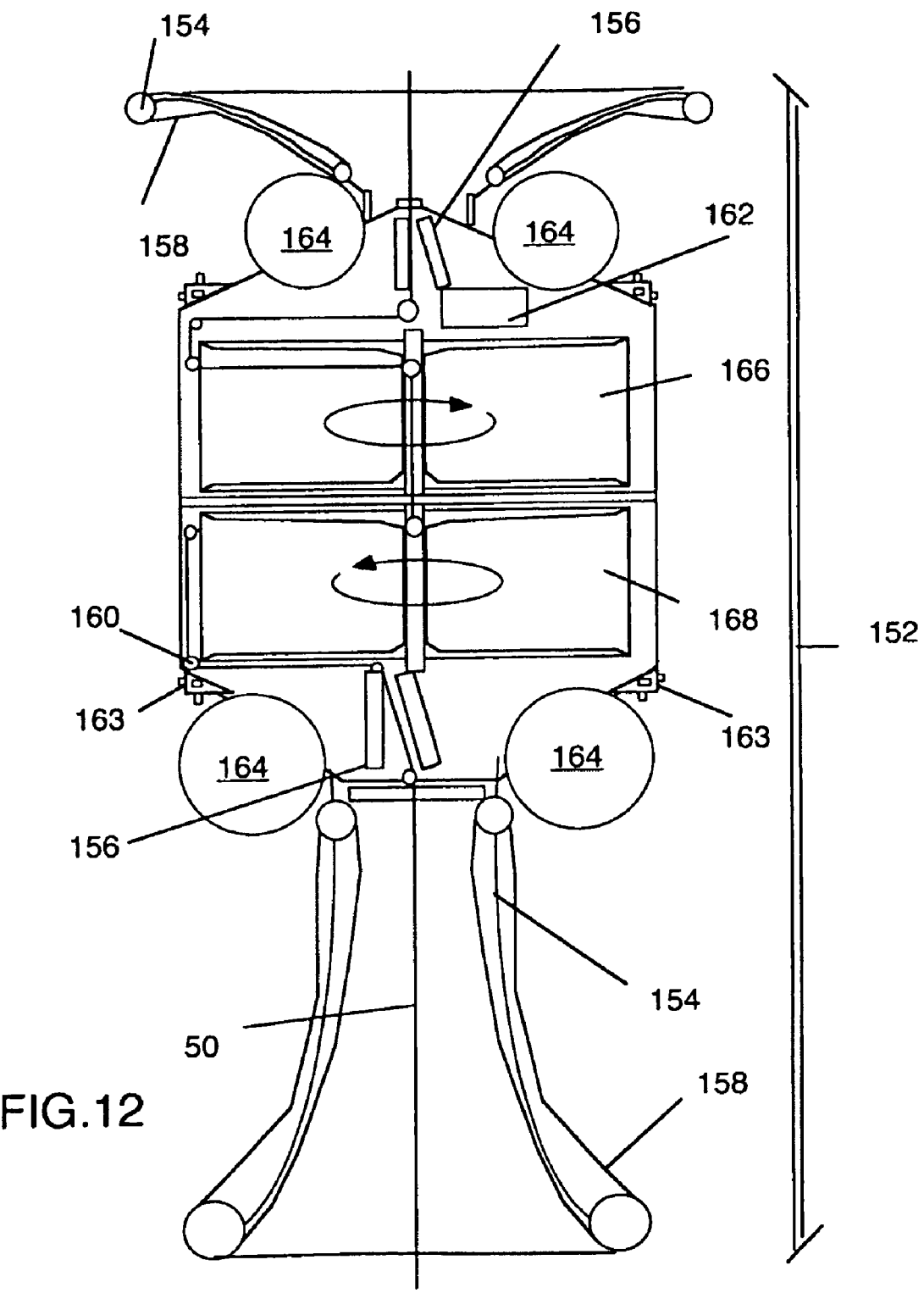
FIG. 12 is a section view showing an exemplary tether sub-node with repair, reverse winding and broken tether cone capture enhancement options, according to an aspect of the present invention.

FIG. 12 depicts a tether sub-node 152 with a tether 50 running through it in such a manner that the tether sub-node 152 can move along the tether 50. The tether sub-node 152 is one of many tether sub-node 152 capable of working together and reattaching with one another in the event of a tether 50 break (see FIG. 11). The tether sub-node 152 uses an attitude control system 162 with attitude control system thrusters 163 using gas from attitude control system tanks 164 to maneuver and re-attach one tether sub-node 152 with another tether sub-node 152. Reattachment is further assisted by an automatic on-the-fly tether splicer 156 capable of joining two separate ends of a broken tether 50. Preferably, the sub-node 152 has a conical shaped belt 158 driven mouth 154 designed to grab and pull in a broken cable.

A tether take-up reel 166 is synchronized within tether sub-node 152 to another tether take-up reel 168 to reel in opposite directions to permit the effective acceleration of the take-up process and to facilitate tether cable replacement. In one embodiment, the reels 166, 168 are inflatable to increase reeling speed due to the increased diameters.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A transportation node system that orbits a celestial body, the system comprising:
a truss having two ends with at least one end of the truss having at least one tether cable with a tether tip, the truss, while orbiting the celestial body, rotating around its center of mass in a direction to control the tether tip in relation to a surface of the celestial body and to substantially cancel a relative velocity between the tether tip and the surface for transferring a payload attached to the tether tip to and/or from the surface.

2. The system of claim 1, further comprising a reel at an end of the truss, the reel configured to reel in or out the payload attached to the tether tip.

3. The system of claim 1, further comprising:
a seeker attachment head coupled to an end of the tether tip, the seeker attachment head adapted to seek, maneuver and capture and/or release the payload.

4. The system of claim 3, in which the payload is configured to couple to a payload carrier top, the carrier top being configured to couple to the seeker attachment.

5. The system of claim 1, further comprising at least one of a rail gun, tower accelerator, forward velocity cart, rocket sled, and inclined mass driver sled to match velocity differences between the tether tip and the surface of the celestial body to reduce a load impact when the payload is transferred between the tether tip and the surface of the celestial body.

6. The system of claim 5, in which the forward velocity cart is adapted to couple to the payload and to move with a matching velocity to reduce a load impact on the tether cable when the payload is transferred between the tether tip and the surface of the celestial body.

7. The system of claim 5, in which the rocket sled is adapted to couple to the payload and to control the ascent and/or descent of the payload to reduce a load impact on the tether cable when the payload is transferred between the tether tip and the surface of the celestial body.

8. The system of claim 5, in which the inclined mass driver sled is adapted to couple to the payload and to propel the payload along an incline to reduce a load impact on the tether cable when the payload is transferred between the tether tip and the surface of the celestial body.

9. The system of claim 5, in which the tower accelerator is adapted to couple to the payload and to propel the payload in a circular motion to reduce a load impact on the tether cable when the payload is transferred between the tether tip and the surface of the celestial body.

10. The system of claim 5, in which the rail gun is adapted to couple to the payload and to move with a matching velocity to reduce a load impact on the tether cable when the payload is transferred between the tether tip and the surface of the celestial body.

11. The system of claim 1, having a mass at least fifteen times a sum of a mass of an average payload and a mass of a transportation craft configured to couple to the system.

12. The system of claim 1, in which the tether cable tip further comprises a tether tip frame attached to the truss via the tether cable, the tether tip frame comprising a storage section for storing payloads.

13. The system of claim 1, in which the tether cable further comprises a tether joint adapted to couple the tether cable to a primary sub-tether cable having a primary tether tip and a primary seeker attachment and at least a one additional secondary sub-tether cable having a secondary tether tip and a secondary seeker attachment, in which each sub-tether is configured to engage a payload.

14. The system of claim 13, further comprising a tether controller at the tether joint to connect to the tether cable to the primary sub-tether cable and the secondary sub-tether cable, in which the primary sub-tether cable is adapted to deposit a first payload on the surface, and the secondary sub-tether cable is adapted to attach to a second payload for removal from the surface in an exchange of payloads that reduces a load impact on the tether cable.

15. The system of claim 1, further comprising:
a plurality of sub-nodes adapted to attach to the tether cable, the sub-nodes having the capability to move along the tether cable.

16. The system of claim 15, each sub-node further comprising:
attitude control thrusters to maneuver the sub-node;
an attitude control system to control the thrusters;
at least one tank to store propellant for the attitude control thrusters; and
take-up reels at the first end and the second end to reel in or out a length of the tether cables.

17. The system of claim 16, in which a first sub-node is attached to one portion of a severed tether cable and a second sub-node is attached to another portion of the severed tether cable, the first sub-node and second sub-node maneuvering toward each other to repair the severed tether cable.

18. The system of claim 17, in which each sub-node further comprises:
a conical shaped belt driven mouth to grab and pull a free end of the severed tether cable to facilitate repair.

19. The system of claim 18, in which each sub-node further comprises:
a splicer to repair the severed tether cable.

20. The system of claim 16, in which the take-up reels are inflatable to increase a diameter of the take-up reel to increase a reeling speed.

21. A method of transferring a payload to and from a celestial body comprising:
reeling in/out from an orbiting truss a tether cable with a tether tip configured to attach to the payload; and
rotating the truss and the tether cable with the attached payload about a combined center of mass in a direction to control the tether tip in relation to a surface of the celestial body and to substantially cancel a relative velocity between the tether tip and the surface for transferring the payload attached to the tether tip to and/or from the surface.

22. A transportation node that orbits a celestial body, the system comprising:
a truss having two ends with least at one end of the truss having at least one means for coupling to a payload;
means, while orbiting the celestial body, for rotating about the truss center of mass in a direction to control the coupling means in relation to a surface of the celestial body and to substantially cancel a relative velocity between the coupling means and the surface for transferring a payload attached to the coupling means to and/or from the surface.

* * * * *